United States Patent [19]

Gellert

[11] Patent Number: 4,669,971
[45] Date of Patent: Jun. 2, 1987

[54] VALVE GATED PROBE

[76] Inventor: Jobst U. Gellert, 7A Prince Street, Georgetown, Ontario, Canada, L7G 4X5

[21] Appl. No.: 742,765

[22] Filed: Jun. 10, 1985

[30] Foreign Application Priority Data

Apr. 30, 1985 [CA] Canada .................................. 480467

[51] Int. Cl.⁴ .............................................. B29C 45/22
[52] U.S. Cl. .................................. 425/549; 264/328.8; 425/562; 425/570; 425/573; 425/588
[58] Field of Search ............... 425/549, 562, 563, 564, 425/566, 568, 570, 573, 581, 588, 547, 569; 264/328.8, 328.11; 156/309.6

[56] References Cited

U.S. PATENT DOCUMENTS

| 3,037,245 | 6/1962 | Darnell | 425/562 |
| 4,013,393 | 3/1977 | Gellert | 425/247 |
| 4,108,956 | 8/1978 | Lee | 425/547 |
| 4,212,627 | 7/1980 | Gellert | 425/564 |
| 4,376,244 | 3/1983 | Gellert | 425/549 |
| 4,555,294 | 11/1955 | Adams et al. | 156/309.6 |

FOREIGN PATENT DOCUMENTS 1177213 11/1984 Canada .................................. 18/703
135332 5/1980 Japan .

Primary Examiner—Jay H. Woo
Assistant Examiner—Timothy W. Heitbrink
Attorney, Agent, or Firm—Riches, McKenzie & Herbert

[57] ABSTRACT

This invention relates to an injection molding system in which melt flows in channels in the outer surface of a heated probe seated in the cavity plate on its way to the gate leading to the cavity. The probe has a tip end in alignment with the gate and the probe is reciprocated between open and closed positions to valve gate the flow of melt to the cavity. According to a preferred embodiment, in a multi-cavity system a number of probes are fixed to a manifold which is actuated to valve gate all of the cavities simultaneously. Hydraulic cylinders are provided to drive the manifold to the closed position, and injection melt pressure acting on the tip ends of the probes is utilized to return them to the open position. Valve gating the heated probes provides the advantage of improved temperature control of the melt in the immediate gate area.

9 Claims, 8 Drawing Figures

VALVE GATED PROBE

BACKGROUND OF THE INVENTION

This invention relates to injection molding and more particularly to an injection molding system with at least one heated probe which is actuated between open and closed positions to valve gate the flow of pressurized melt to the cavity.

Valve gating is, of course, well known in the art. However, this normally involves actuating a valve pin which is mounted centrally in a heated nozzle to control the flow of melt through the gate. An example of this type of hydraulically actuated valve pin is disclosed in the applicant's Canadian Pat. No. 1,177,213 which issued Nov. 6, 1984. While some of these valve pins are driven in both directions, some of these previous systems just drive the valve pin to the closed position and rely on injection melt pressure to return the pin to the open position. Examples of this are shown in the applicant's U.S. Pat. No. 4,013,393 which issued Mar. 22, 1977 and Japanese Patent Application Laid Open No. 55-61438 to Tokuhara which was published May 9, 1980.

Similarly, it is well known to have injection molding systems with a heated probe mounted in a fixed position in a well in the cavity plate around which the melt flows to the gate. An example of this is shown in the applicant's U.S. Pat. No. 4,376,244 which issued Mar. 8, 1983. More recently, the applicant's U.S. patent application Ser. No. 537,054 filed Sept. 29, 1983 now U.S. Pat. No. 4,576,567 and continuation-in-part application Ser. No. 680,286 filed Dec. 10, 1984 now U.S. Pat. No. 4,611,394 disclose probes having external melt channels or grooves extending longitudinally.

While fixed probes are entirely satisfactory for many applications, for some difficult to mold materials it is desirable to use valve gating. However, valve gating has had the disadvantage that the valve pin is not heated, which can result in problems with the valve pin tip seating improperly in the gate due to melt solidification in the area.

SUMMARY OF THE INVENTION

Accordingly, it is an object of the invention to at least partially overcome the disadvantages of the prior art by providing an injection molding system with a heated probe which reciprocates in a well in the cavity plate to valve gate the flow of melt to the cavity.

To this end, in one of its aspects, the invention provides a hot runner injection molding system having a hot runner passage extending to convey pressurized melt from a molding machine to a gate in a cooled cavity plate leading to a cavity and an elongated heated probe with a tip end received in a well in the cavity plate, the probe having an outer surface with at least one melt channel extending therein generally longitudinally adjacent the tip end, the improvement wherein the probe is received in the well for reciprocal motion in a longitudinal direction according to a predetermined cycle between a closed position in which a portion of the tip end of the probe is received in the gate in the cavity plate and an open retracted position; actuating means are provided to drive the probe from the open to the closed position; and a melt receiving space is provided in the well around the tip end of the probe whereby sufficient force can be applied to the probe by the injection pressure of the melt to drive the probe to the retracted open position.

Further objects and advantages of the invention will appear from the following description taken together with the accompanying drawings.

DESCRIPTION OF THE PREFERRED EMBODIMENTS

Figure 1:
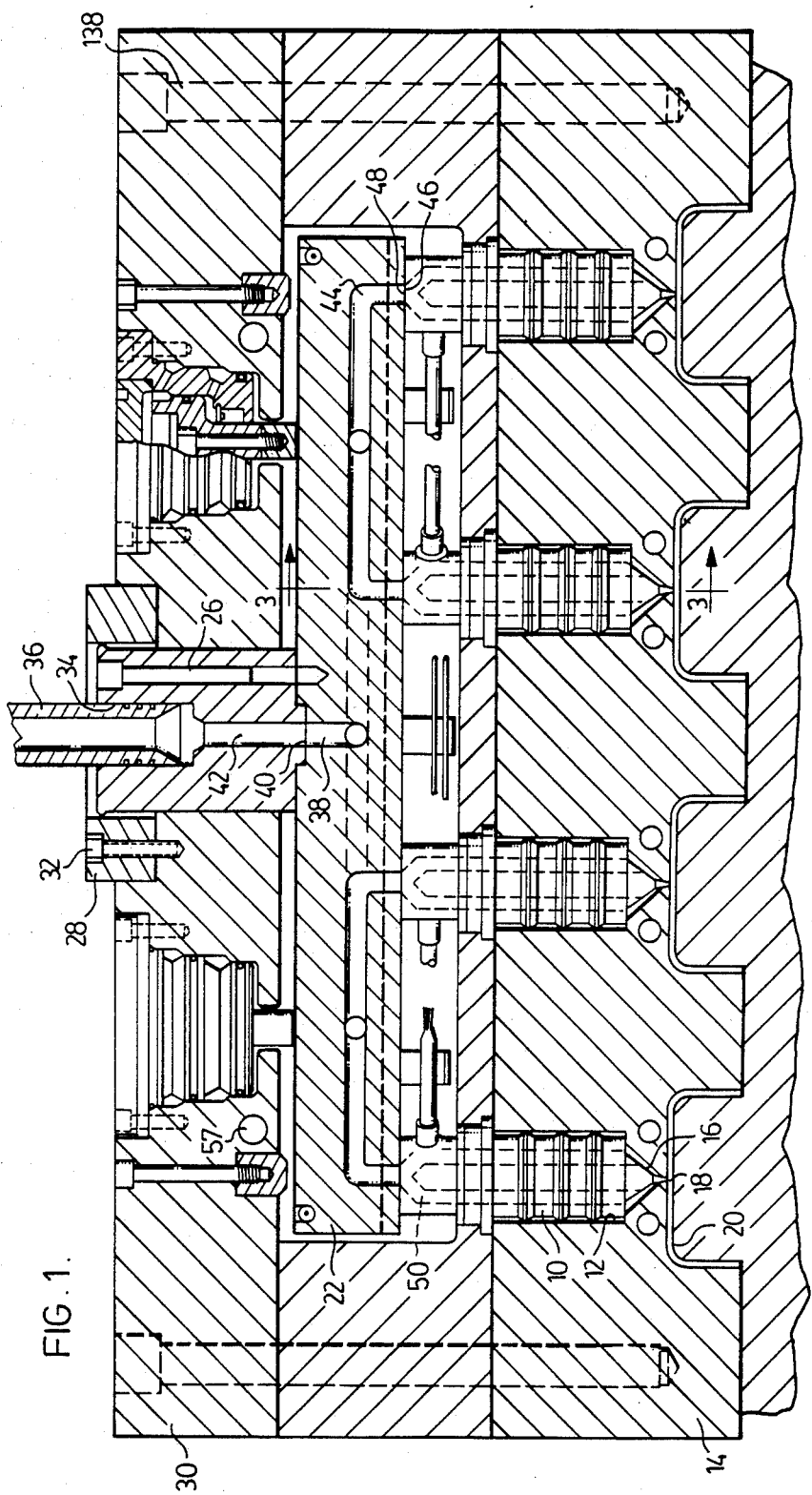
FIG. 1 is a sectional view of a portion of multi-cavity injection molding system showing a preferred embodiment of the invention.

Reference is first made to FIG. 1 which shows a portion of a multi-cavity injection molding system having a number of elongated heated probes 10. Each probe 10 is seated in a cylindrical well 12 in the cavity plate 14 and has a conical tip end 16 in alignment with a gate 18 leading to a cavity 20. As may be seen in FIG. 3, each probe 10 is fixed to an elongated manifold 22 by bolts 24. A manifold extension 26 is fixed to the manifold 22 and is located by a locating ring 28 which is fixed to the back plate 30 by screws 32. The manifold extension 26 has a central barrel 34 for receiving the plunge nozzle 36 of the molding machine.

A hot runner passage 38 extends from the central receiving barrel 34 of the manifold extension 26, through the manifold 22 and past the heated probes 10 to each of the gates 18. The manifold 22 is manufactured using two plates according to the method described in the applicant's copending U.S. patent application Ser. No. 725,799 filed Apr. 22, 1985 entitled "Composite Plate Method of Manufacturing Injection Molding Manifold".

The hot runner passage 38 extends through the manifold from an inlet opening 40 in alignment with a central bore 42 in the manifold extension 26 to a number of branches 44, each leading to an outlet opening 46 in alignment with a central inlet 48 in the respective one of the probes 10. In each of the probes 10, the hot runner passage branches outward from the central inlet 48 through two diagonal bores 50 to a pair of longitudinal channels 52, which will be described in more detail below. The manifold 22 is heated by an electrical heating element 54 which is cast into it by the method described in the above mentioned patent application to maintain the melt at a predetermined uniform temperature as it flows through it. Power is supplied to the heating element 54 through terminals 56 extending from the manifold. The cavity plate 14 and back plate 30 are cooled in a conventional manner by water flowing through cooling ducts 57. The heated manifold 22 is spaced from the cool back plate 30 and surrounding support plate 58 by an insulative air gap 60.

As shown in FIGS. 3-6, each probe 10 has an upstream portion 62 and a downstream portion 64 which meet at a shoulder 66. The probe is heated by a cartridge heater 68 which is cast into a tool steel outer body 70 by a highly conductive copper portion 72. The steel outer body 70 has sufficient strength and corrosion resistance to withstand the effect of the hot pressurized melt, while the copper portion 72 is sufficiently conductive to distribute the heat from the heater 68 uniformly along the outer body 70. The cartridge heater 68 is of a conventional structure with an electrical resistance wire 74 compressed in a magnesium oxide refractory powder 76 in a generally cylindrical outer casing 78. The ends of the heating wires 74 are connected to larger diameter lead wires 80 which extend in a terminal 82 which projects from the upstream portion 62 of the probe and are connected to a power source (not shown) in a conventional manner.

Figure 3:
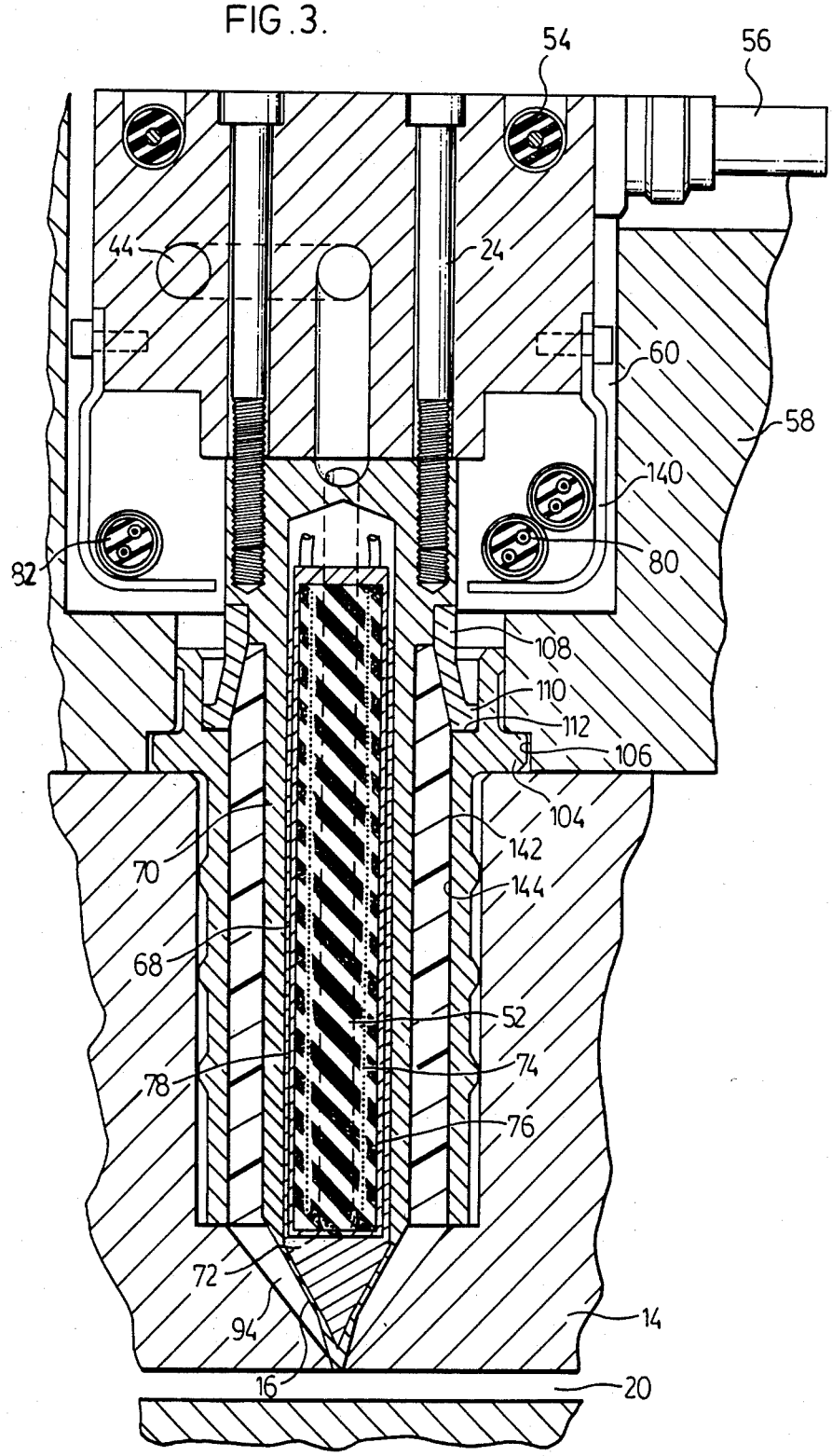
FIG. 3 is a sectional view along line 3—3 in FIG. 1 showing one of the probes in the closed position.

The downstream portion 64 of the steel outer body 70 has an outer surface 84 with two melt channels 52 which extend longitudinally from the bores 50 which extend diagonally outward from the central inlet 48 through the upstream portion 62. These outwardly open channels 52 are in alignment with matching inwardly open grooves 88 in the inner surface 90 of an insulating sleeve 92 which fits over the downstream portion 64 of the probe. Each matching channel 52 and groove 64 forms a portion of the hot runner passage which extends to a melt receiving space 94 provided at the end of the insulating sleeve 92 between the conical tip end 16 of the probe 10 and the surrounding cavity plate 14. The cylindrical insulating sleeve 92 is, in turn, surrounded by a steel locating sleeve 96 which has a number of spaced ribs 98 which abut against the inner cylindrical wall 100 of the well 12. In addition to locating the steel sleeve 96 in the well 12, these ribs 98 provide insulative air gaps 102 between the heated probe 10 and the cooled cavity plate 14. The steel locating sleeve 96 has an outwardly projecting flange 104 which is locked in a seat 106 between the cavity plate 14 and the support plate 58 to retain the locating sleeve 96 in a fixed position. A steel insulation bushing 108 is brazed to the upstream portion 62 of the probe and has a lower flanged portion 110 which abuts against a shoulder 112 of the steel locating sleeve 96 in the closed position, as shown in FIG. 3. In the open position shown in FIG. 4, the withdrawal of the manifold 22 and probe 10 leaves a cylindrical cap 114 between the insulation bushing 108 and the shoulder 112 which is bridged by the insulating sleeve 92. Therefore, while this sleeve 92 has previously been formed of a thermoplastic material having a high melting temperature and low thermal conductivity such as NYLON 6—6 glass filled, it has now been found advantageous to make it of polyetheretherketone (PEEK) to provide sufficient strength to withstand the injection pressure of the melt in the channels 86.

Figure 2:
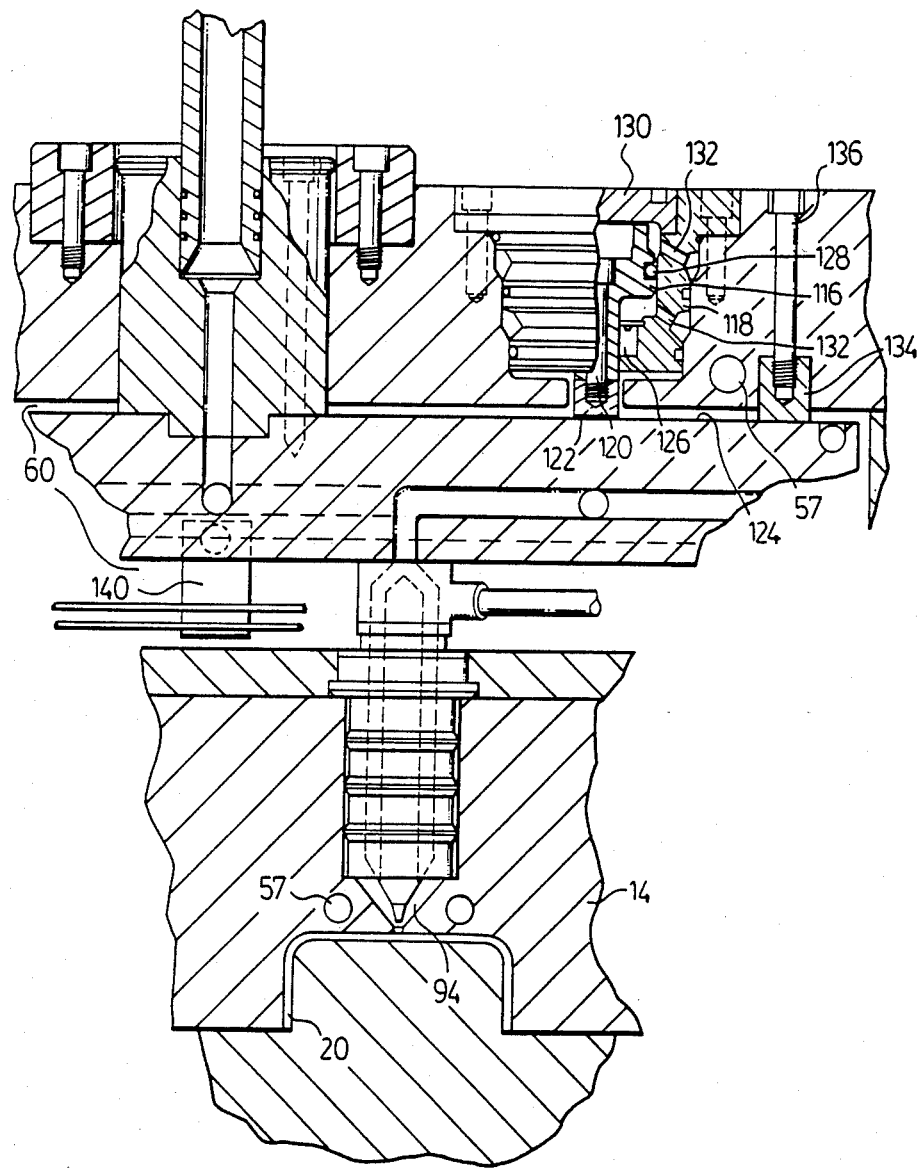
FIG. 2 is a similar expanded view showing a portion of the system seen in FIG. 1.

Referring again to FIGS. 1 and 2, it can be seen that a pair of hydraulically actuated pistons 116 are mounted in cylinders 118 in the back plate 30 on opposite sides of the manifold extension 26. Each piston 116 is connected to drive a piston rod 120 with an adjustable tip 122 which is in contact with the upper surface 124 of the manifold 22. A high temperature seal 126 is provided around the neck of each piston, and an O-ring 128 is seated to provide a seal between the piston and the cylinder wall. Each cylinder 118 is bolted in position in the back plate 30 and has a removable cap 130 to facilitate removal of the piston. Each cylinder has hydraulic fluid ducts 132 which lead to opposite sides of the piston. An adjustable stop 134 is mounted on a bolt 136 extending through the back plate 30 beside each of the pistons 116.

In use, the system is assembled as shown in FIG. 1, with bolts 138 securing the cavity plate 14, support plate 58 and back plate 30 together. The tips 122 of piston rods 120 are adjusted so that the tip ends 16 of the probes 10 are seated in the respective gates 18 in the closed position, and the adjustable stop 134 are set so that they are retracted a predetermined distance in the open position. Electrical power is applied to the terminals 56 of the heating element 54 in the manifold and to the terminals 82 of each of the probes 10 to heat them to a predetermined operating temperature. For convenience, the cold terminals 82 and lead wires 80 running to the various probes are retained beneath the manifold 22 by L-shaped clips 140 fastened at intervals to the outside of the manifold. Pressurized hydraulic fluid is applied to the fluid ducts 132 leading to opposite sides of the pistons, and pressurized melt is introduced into the hot runner passage from the plunge nozzle 36 of the molding machine controlled according to a predetermined operating cycle by conventional means (not shown). The pressurized melt flows through the manifold extension 26 into the manifold 22 where it branches out to each of the nozzles 10 attached to the manifold 22. The melt flowing into the central inlet 48 of each of the probes 10 branches out through the two diagonal bores 50 to the respective longitudinal channels 52 which carry it to the melt receiving space 94 around the tip end 16 of the probe 10. From there, it flows through the gate 18 and into the cavity 20.

Figure 4:
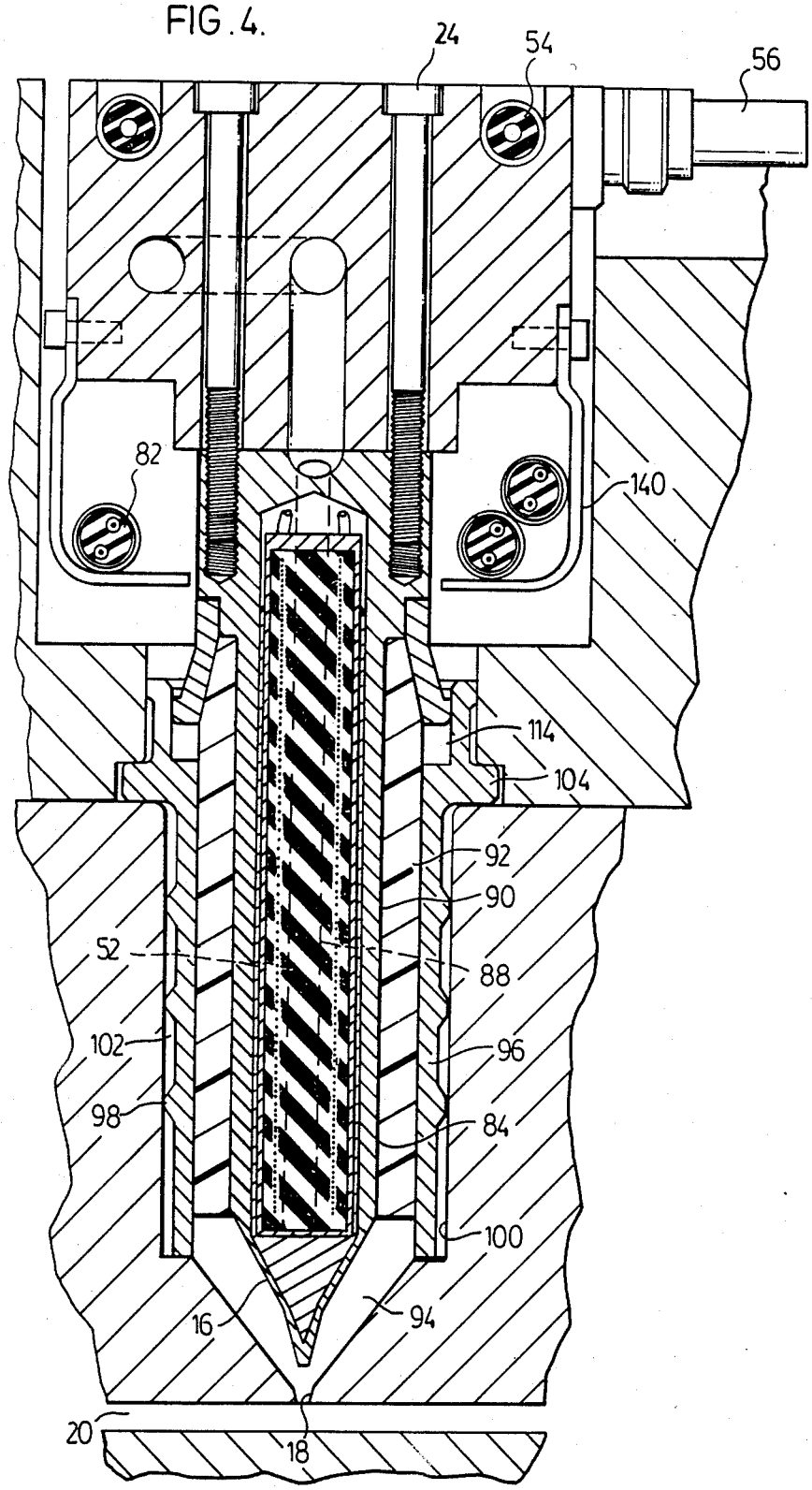
FIG. 4 is a similar sectional view showing the probe in the open position.
Figure 5:
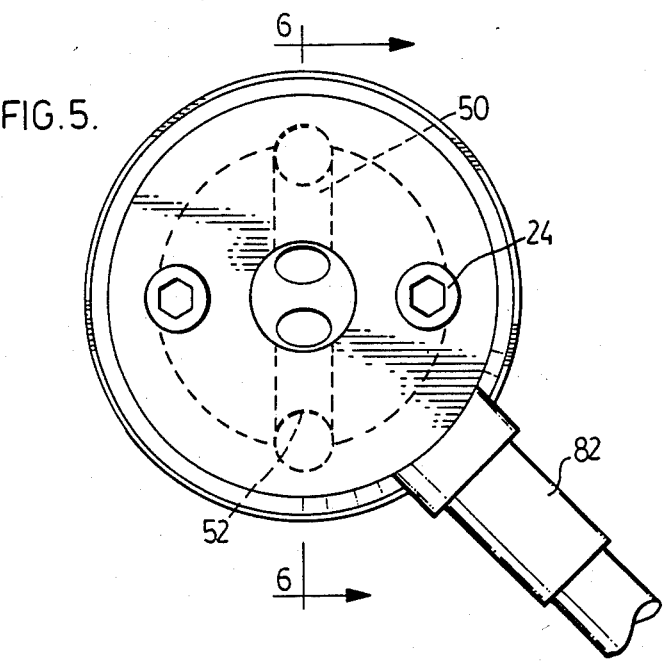
FIG. 5 is a plan view of one of the probes.
Figure 6:
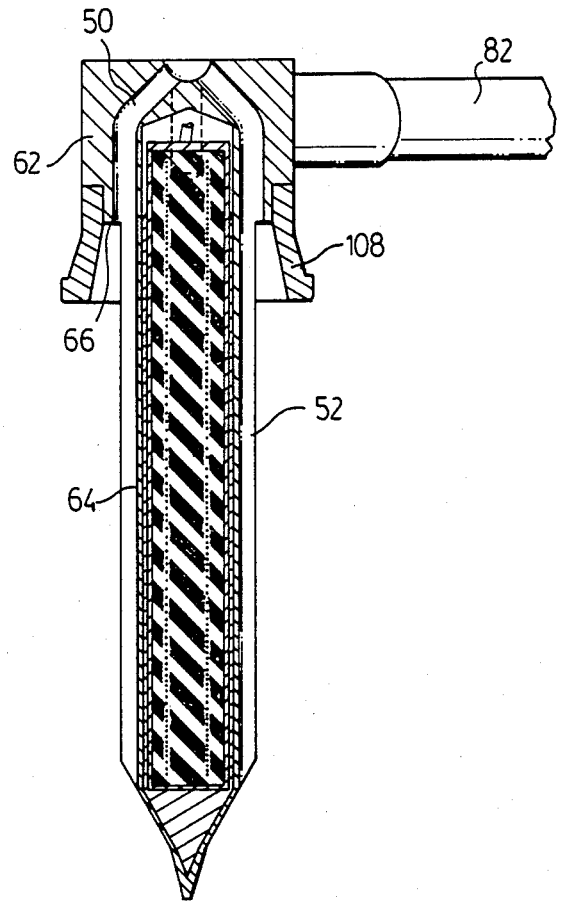
FIG. 6 is a sectional view along line 6—6 in FIG. 5.

After the hot runner passage 38 is initially full, the application of injection pressure from the molding machine and the release of hydraulic pressure to the pistons 116, results in the force of the pressurized melt in the melt receiving spaces 94 against the conical tip ends 16 driving the probes 10 and the manifold 22 from the forward closed position shown in FIG. 3 to the retracted open position shown in FIG. 4. The melt then flows through the gates 18 and fills the respective cavities 20. Injection pressure is held for a few seconds to pack and then hydraulic pressure is applied to the pistons 116 to drive the manifold 22 and probes 10 to the forward closed position in which the tip ends 16 of the probes 10 are seated in the gates 18. The high injection pressure is then released and the mold is opened for ejection in a conventional manner following a short cooling period. When the mold is reclosed, the hydraulic pressure to the pistons 116 is released and injection pressure reapplied which reopens the gates 16. This sequence is normally repeated several times per minute and the system must be capable of operating for a long period of time without malfunctioning.

As the manifold 22 and probes 10 are reciprocated between the open and closed positions, the outer surface 142 of each insulating sleeve 92 slides against the inner surface 144 of the fixed steel locating sleeve 96. As mentioned above, in the retracted open position, the insulating sleeve 92 bridges the cylindrical gap 114 and it therefore must be made of material having a relatively low coefficient of friction, but a high strength to withstand the high injection pressure of the melt at temperatures of approximately 600° F. While polyetheretherketone has been found suitable for this purpose, other materials having similar characteristics may also be used.

Figure 7:
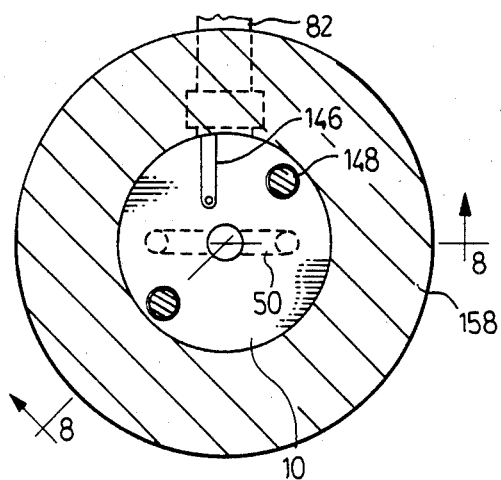
FIG. 7 is a partial plan view of an injection molding system showing another embodiment of the invention.
Figure 8:
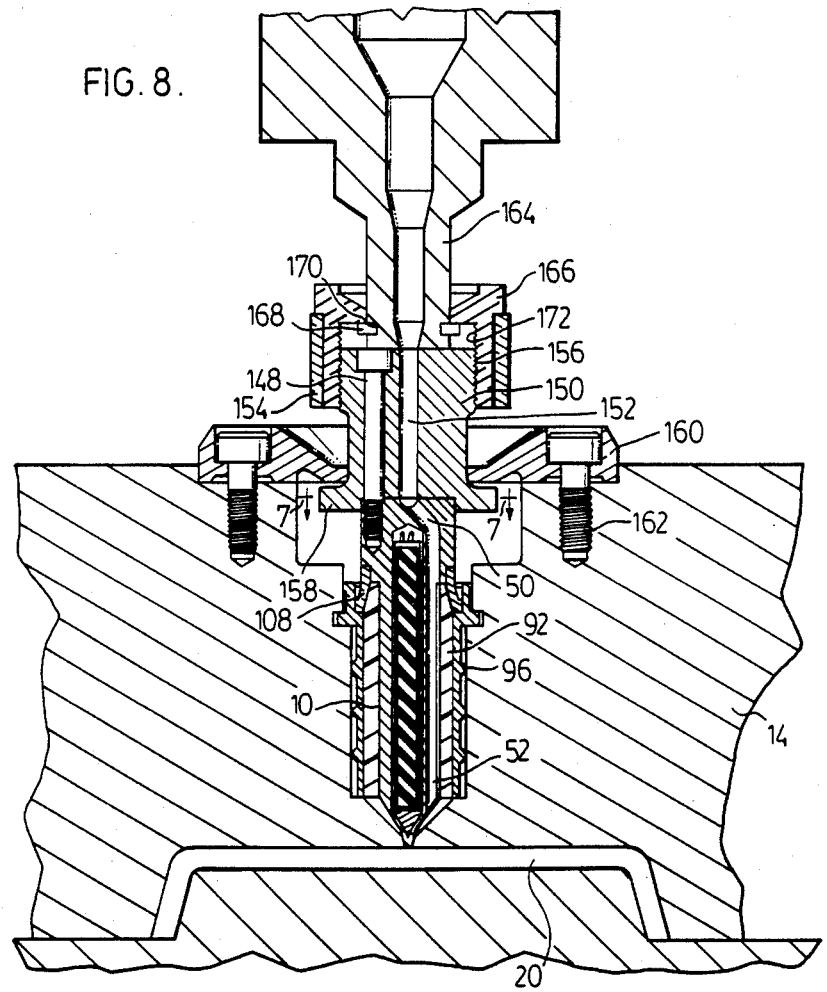
FIG. 8 is a sectional view along line 8—8 in FIG. 7.

Reference is now made to the embodiment of the invention shown in FIGS. 7 and 8. In this embodiment, the injection molding system has only a single probe 10 and therefore no manifold is required. Furthermore, in this embodiment, the nozzle is driven closed by the action of the molding machine cylinder head and therefore no hydraulically actuated pistons are required. As many of the elements are identical to those of the first embodiment described above, elements common to both embodiments are described and illustrated using the same reference numerals.

The probe 10 is similarly seated for reciprocal motion in a well 12 in the cavity plate 14 and its structure is the same as that described above, except that it is shown having a thermocouple 146 which extends through the probe 10 to measure the temperature of the copper portion 72 adjacent the tip end 16 as is known in the art. The insulating sleeve 92, locating sleeve 96 and insulation bushing are also essentially identical to those described above and it need not be repeated.

However, in this embodiment, the probe 10 is fixed by bolts 148 to a steel connector 150 having a central bore 152 extending therethrough in alignment with the central inlet 48 to the probe 10. The connector also has an outer threaded portion 156, a lower flanged portion 158, and is retained in position by a locating ring 160 which is fixed by screws 162 to the cavity plate 14. The cylinder head 164 of the molding machine has a hollow collar 166 which is connected to it by a split ring 168 engaged in a seat 170 in the cylinder head 164. The collar 166 has internal threads 172 which engage the threaded outer portion 156 of the connector 150 to securely attach the cylinder head 164 to the connector 150. The collar 166 and the connector 150 are heated to a predetermined temperature by a band heater 154 extending around the collar 160 to maintain the temperature of the melt flowing through the central bore 152.

In use, the system is assembled as shown, with the cylindrical head 164, connector 150 and probe 10 all connected together to reciprocate as a unit. The conventional molding machine is actuated hydraulically and is connected (not shown) in a manner which causes it to advance a predetermined distance after injection is completed. Thus, when the probe 10 is in the advanced closed position shown in FIG. 8 with the tip end 16 sealing the gate 18 and injection pressure is applied, the force of the melt in melt receiving space 94 assists the probe 10 and the cylinder head 164 to retract to the open position. The pressurized melt from the molding machine then flows along the hot runner passage 38 extending through the connector 150 and the diagonal bores 50 and longitudinal channels 52 in the nozzle 10, to the open gate 18 and into the cavity 20. After the cavity 20 has been filled and packed, the cylinder head 164 is actuated to advance the probe 10 to the closed position and injection pressure is released. The mold is then opened for ejection in a conventional manner, following which the cycle is repeated. While this embodiment has the advantage that the manifold and pistons are not required, it of course, has the disadvantage that only a single probe can be used and therefore it is only feasible to use it for certain applications.

While the description of this invention has been given with respect to particular embodiments, it is not to be construed in a limiting sense. Variations and modifications will occur to those skilled in the art. For instance, it is apparent that the system may be pneumatically actuated rather than hydraulically actuated, and may even be spring actuated from the open to the closed positions. Also, the system could have various manifold and probe configurations other than the one shown. Reference is made to the appended claims for a definition of the invention.

What I claim is:

1. In a multi-cavity hot runner injection molding system having a hot runner passage extending to convey pressurized melt from a molding machine to plurality of gates in a cooled cavity plate, each gate leading to a cavity, and a plurality of elongated heated probes, each probe having a tip end received in a well in the cavity plate and an outer surface with at least one melt channel extending therein generally longitudinally adjacent the tip end, the improvement wherein:
    (a) each probe is received in a respective well for reciprocal motion in a longitudinal direction according to a predetermined cycle between a closed position in which a portion of the tip end of the probe is received in a respective gate in the cavity plate and an open retracted position;
    (b) the plurality of probes are fixed to a common manifold and actuating means are provided to drive the manifold and the probes from the open to the closed position, the hot runner passage extends through the manifold and branches in the manifold to convey melt from a single inlet opening to a plurality of outlet openings; and
    (c) a melt receiving space is provided in the well around the tip end of each probe whereby sufficient force can be applied to the probes by the injection pressure of the melt to drive the probes and the manifold to the retracted open position.

2. An injection molding system as claimed in claim 1 wherein the manifold is elongated and the actuating means include a pair of hydraulically actuated pistons mounted to drive the manifold to provide balanced simultaneous movement of the probes fixed to the manifold from the open to the closed position.

3. An injection molding system as claimed in claim 1 wherein the manifold has a plunge nozzle receptacle to receive pressurized melt from a fixed plunge nozzle on the molding machine without substantial leakage.

4. An injection molding system as claimed in claim 1 wherein each well has a wall which extends around the outer surface of the respective probe to provide a space therebetween, and an insulating sleeve is located in said space between the probe and the cavity plate, the insulating sleeve having an inner surface abutting against the outer surface of the probe, the inner surface of the sleeve having at least one longitudinal groove which is in alignment with the melt channel in the outer surface of the probe to form a portion of the runner passage.

5. An injection molding system as claimed in claim 4 wherein the sleeve is generally cylindrical.

6. An injection molding system as claimed in claim 5 in which the sleeve is formed of polyetheretherketone.

7. An injection molding system as claimed in claim 4 wherein a steel locating sleeve is provided between the insulating sleeve and the wall of the well.

8. An injection molding system as claimed in claim 7 wherein the locating sleeve has locating projections which extend outward to contact the wall of the well and provide an insulative air gap therebetween.

9. An injection molding system as claimed in claim 8 wherein the probe has at least one melt bore extending diagonally from a central inlet to connect with said at least one longitudinal channel.

* * * * *